United States Patent [19]
Kenyon

[11] 3,861,722
[45] Jan. 21, 1975

[54] FLANGE ADAPTOR

[75] Inventor: Stewart S. Kenyon, Edmonton, Alberta, Canada

[73] Assignee: Coupco Limited, Toronto, Ontario, Canada

[22] Filed: Sept. 7, 1973

[21] Appl. No.: 394,968

[30] Foreign Application Priority Data
July 31, 1973  Canada ................................ 177698

[52] U.S. Cl. .............................................. 285/337
[51] Int. Cl. ............................................. F16l 17/00
[58] Field of Search ..................... 285/337, 314, 315

[56] References Cited
UNITED STATES PATENTS

| | | | |
|---|---|---|---|
| 608,613 | 8/1898 | Linich ................................ | 285/337 |
| 1,423,754 | 7/1922 | Clark ............................. | 285/337 X |
| 1,851,574 | 3/1932 | Fiederlein ...................... | 285/415 X |
| 1,866,619 | 7/1932 | Carson ........................... | 285/337 X |
| 1,962,401 | 6/1934 | McWane ......................... | 283/337 X |
| 2,016,262 | 10/1935 | Arey et al ...................... | 285/415 X |
| 3,414,297 | 12/1968 | Pollia ............................. | 285/415 X |

FOREIGN PATENTS OR APPLICATIONS
102,357  11/1923  Switzerland ........................ 285/415

*Primary Examiner*—Alfred R. Guest
*Attorney, Agent, or Firm*—Sim & McBurney

[57] ABSTRACT

This invention provides a flange adaptor assembly used to secure the end of a pipe against a flanged element. The pipe has a peripheral external groove adjacent to but spaced from the end of the pipe, and a retaining ring is located in the groove, dimensioned to project beyond it. The adaptor is received slidably over the pipe and has a portion which abuts the retaining ring, and another portion which diverges outwardly away from the pipe in the direction of the pipe end. An annular gasket is provided, having a cylindrical inner face and a diverging outer face substantially complementary to the outwardly diverging part of the annular adaptor, the gasket generally extending beyond the divergent part.

10 Claims, 1 Drawing Figure

PATENTED JAN 21 1975 3,861,722
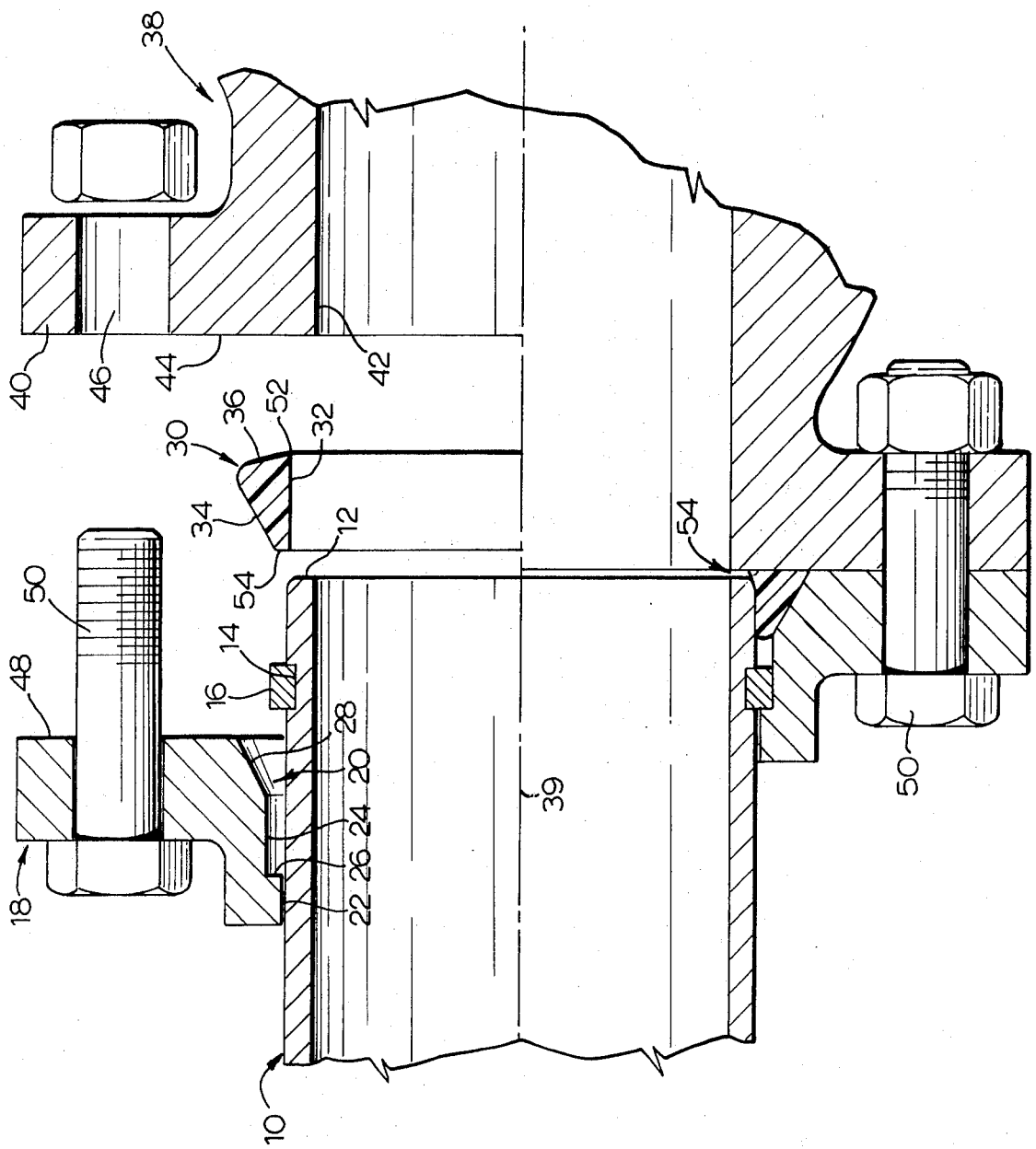

FLANGE ADAPTOR

This invention relates generally to improvements in pipe coupling assemblies in which a pipe is provided with a detachable flange adaptor by means of which the pipe can be sealingly attached to the flange of a body member such as a valve.

One object of this invention is to provide a flange adaptor assembly for a pipe having a simplified construction but at the same time providing an efficient and reliable seal.

Accordingly, this invention provides, in combination, a pipe having a peripheral external groove adjacent to but spaced from an end of the pipe, a retaining ring in the groove dimensioned to project beyond the groove, an annular adaptor having an interior profile which includes a first portion snugly but slidably receivable over the pipe, a substantially cylindrical second portion dimensioned to receive the retaining ring snugly but slidably, a step between the first and second portions, and a third portion adjacent the second portion and diverging from the second portion in the direction remote from the first portion. The assembly further includes an annular gasket of resilient material, the gasket having a substantially cylindrical inner face, a diverging outer face substantially complementary to the third portion of the annular adaptor, and an end face spanning between the inner and outer faces remote from the retaining ring. The axial extent of the inner face of the annular gasket is greater than the axial extent of the third portion of the annular adaptor.

Preferably, the assembly is utilized with an annular flange member, such as would be provided on a valve, having a flat sealing surface and a bore with which the pipe is in sealed communication, the flat sealing surface being in compressive contact with the end face of the gasket, thereby compressing the latter within the annular space defined by the pipe, the third portion of the adaptor and the sealing surface of the flange member.

In the preferred embodiment, the end face of the gasket converges sharply in the direction opposite the divergent direction of the outer face when the annular gasket is unstressed and uncompressed.

One embodiment of this invention is shown in the accompanying drawing, in which the single FIGURE is divided into an upper portion showing the essential components of this invention in axial section and in exploded relation to one another, and a lower portion showing the components of this invention secured together in operative relation.

Attention is now directed to the drawing, and specifically to the upper portion thereof which shows in axial section a pipe 10 having an end 12 and a peripheral external groove 14 adjacent to but spaced from the end 12 of the pipe. The groove in section has a flat bottom wall and two upstanding side walls. Situated in the groove 14 is a retaining ring 16 which in the embodiment shown is rectangular in section. The retaining ring 16 is preferably of the split-ring type and is thus penannular in configuration. Naturally, the retaining ring 16 could be made in two semi-circular sections or any other configuration which permits insertion and removal of the retaining ring 16 with respect to the groove 14.

Also provided is an annular adaptor 18 which has an interior profile 20 which includes a first portion 22 which is snugly but slidably receivable over the pipe 10, a substantially cylindrical second portion 24 which is dimensioned to receive and encompass the retaining ring 16 snugly but slidably, and a step 26 between the first portion 22 and the second portion 24. The interior profile 20 of the annular adaptor 18 further includes a third portion 28 adjacent the second portion 24 but which diverges away from the second portion 24 in the direction remote from the first portion 22. Preferably, the diverging third portion 28 is of conical configuration, although it will be realized from what follows that a conical surface is not essential.

Further provided is an annular gasket 30 of resilient material. The gasket 30 includes a substantially cylindrical inner face 32, a diverging outer face 34 which is substantially complementary to the third portion 28 of the annular adaptor 18, and an end face 36 spanning between the inner face 32 and the outer face 34. In the illustration the end face 36 is remote from the retaining ring 16, and when the different parts are assembled together as shown in the bottom half of the figure this orientation is kept.

Since the preferred construction of the third portion 28 of the annular adaptor 18 is conical, it will be appreciated that the outer face 34 of the gasket 30 is also preferably conical.

It will be noted that the axial extent of the inner face 32 (i.e., its dimension in the direction parallel to the axis 38 of the pipe 10) is greater than the axial extent of the third portion 28 of the annular adaptor 18. The reason for these comparative dimensions will be clear from what follows.

In the preferred embodiment shown in the accompanying drawings, the end face 36 converges sharply in the rightward direction, which is the direction opposite to the divergent direction of the outer face 34. It will be understood that the angles and divergencies discussed above apply to the gasket 30 when it is unstressed and uncompressed.

The portions just described are intended to be utilized in combination with an annular flange member shown generally at 38, which may, for example, constitute a portion of a valve for insertion in a pipe line. The annular flange member 38 has a flange 40, a central bore 42 intended to be in sealed communication with the pipe 10 when the assembly is secured together, and a flat sealing surface 44. The flange 40 is provided with a plurality of bolt-holes 46 capable of alignment with a plurality of bolt-holes 48 in the annular adaptor 18 fitted around the pipe 10.

The annular adaptor 18 has a contact face 48 extending upwardly adjacent the third portion 28 of the interior profile 20. The contact face 48 is preferably perpendicular to the axis 39 of the pipe 10. It is also preferred that the contact face 48 be spaced from the first portion 22 (i.e., from the step 26) by a distance sufficient to cause the contact face 48 to be situated slightly beyond (to the right of) the end of the pipe 10 when the first portion 22 (the step 26) is tight against the retaining ring 16 in the peripheral groove 14.

The result of this comparative dimensioning is shown in the bottom portion of the figure, to which attention is now directed. As can be seen, when all the parts are assembled together, the contact face 48 of the adaptor 18 is in contact with the sealing surface 44 of the flange member 38. As also illustrated, the flat sealing surface 44 of the flange member 38 is in compressive contact with the end face 36 of the gasket 30, thereby compressing the gasket 30 within an annular space defined by the outer surface of the pipe 10, the third portion 28 of the annular adaptor 18, and the sealing surface 44 of the flange member 38.

As illustrated, bolts 50 are advantageously utilized to tightly secure the flange 40 of the flange member 38 against the contact face 48 of the annular adaptor 18. Naturally, any other convenient means for tightly securing these parts together could also be utilized.

The reason why the gasket 30 has its end face 36 dimensioned to project beyond both the end 12 of the pipe 10 and the plane containing the contact face 48 when the parts are all assembled together as shown in the bottom half of the figure will now be understood. Firstly, it is necessary to give the gasket 30 a cross-sectional configuration whereby the sealing surface 44 will compressively contact a projecting portion of the gasket 30 and compress it within the annular space defined by the pipe 10, the third portion 28 and the sealing surface 44. Secondly, because the preferred embodiment of the gasket 30 includes a rightwardly convergent end face 36 (forming a reasonably large acute angle with the axis 38), it will be realized that during assembly as the bolts 50 are gradually tightened, the sealing surface 44 come first into contact with the "nose" 52 of the gasket 30, forming a circular line contact therewith, and that this "nose" 52 is gradually driven leftwardly with respect to the remainder of the gasket 30. Because the "nose" 52 receives the greatest compressive stress first, it will have a tendency to deform and "bulge" slightly inwardly axially with respect to the pipe 10, whereby it will be partly wedged between the end 12 of the pipe 10 and the sealing surface 44, as can be seen in the lower portion of the drawing at 54.

It is believed that the superior sealing characteristics of the preferred embodiment of the invention, in which the end face 36 is sharply convergent as shown in the drawing (top portion), are at least in part accounted for by the wedging or bulging of the "nose" 52 as illustrated at 54 in the drawing.

The gasket 30 is also seen to have a radial face 54 between the inner face 32 and the first diverging outer face 34, the radial extent of the radial face 54 being substantially the same as the radial projection of the retaining ring 16 beyond the groove 14.

During a hydrostatic pressure test of a 3 inch flange assembly constructed substantially to the comparative dimensional ratios shown in the accompanying FIGURE, the assembly showed itself capable of withstanding pressures up to 1,190 psi without leakage.

It will be understood that the embodiment shown in the accompanying drawing and described above is intended to be illustrative only, and not limitative with respect to the invention. Variations and modifications of the inventive principle can be made without departing from the essence of the invention, which latter is to be interpreted only in the light of the appended claims.

What I claim as my invention is:

1. In combination:
   a pipe having a peripheral external groove adjacent to but spaced from an end of the pipe,
   a retaining ring in said groove, dimensioned to project beyond said groove,
   an annular adaptor having an interior profile which includes a first portion snugly but slidably receivable over said pipe, a substantially cylindrical second portion dimensioned to receive the retaining ring snugly but slidably, a step between said first and second portions, and a third portion adjacent said second portion and diverging from said second portion in the direction remote from said first portion,
   and an annular gasket of resilient material, the gasket having a substantially cylindrical inner face, a diverging outer face substantially complementary to said third portion of the annular adaptor, and an end face spanning between said inner and outer faces remote from said retaining ring, the axial extent of the inner face being greater than the axial extent of said third portion of the annular adaptor.

2. The combination claimed in claim 1, further including an annular flange member having a flat sealing surface and a bore with which the pipe is in sealed communication, the flat sealing surface being in compressive contact with said end face of said gasket, thereby compressing the latter within the annular space defined by the pipe, said third portion of the adaptor and the sealing surface of the flange member.

3. The combination claimed in claim 2, in which the annular adaptor has a contact face adjacent said third portion and spaced from said step by a distance sufficient to cause the contact face to be situated slightly beyond the end of the pipe when the step is tight against the retaining ring in said peripheral groove, the contact face of the adaptor being in contact with the sealing surface of the flange member, the combination further including means for securing said annular adaptor against said flange member.

4. The combination claimed in claim 1, in which said end face converges sharply in the direction opposite the divergence direction of said outer face when the annular gasket is unstressed and uncompressed.

5. The invention claimed in claim 1, in which the gasket has a radial face between the cylindrical inner face and the first diverging outer face, the radial extent of said radial face being substantially the same as the radial projection of said retaining ring beyond the peripheral groove.

6. The combination claimed in claim 3, in which said means includes an outward flange integral with the annular adaptor and having bolt holes aligned with bolt holes in said flange member, and threaded bolts through said aligned bolt holes securing said annular adaptor and said flange member together.

7. In combination:
   a pipe having a peripheral groove adjacent but spaced from its end,
   a retaining ring in said groove and projecting radially out of the groove,
   an annular adaptor with a cylindrical inner wall for snugly receiving said retaining ring, an inward flange at one end of the cylindrical inner wall, the inward flange receiving the pipe but having mechanical interference with the retaining ring, and a diverging inner wall at the other end of the cylindrical inner wall, the diverging inner wall diverging in the direction away from the inward flange and terminating at a location spaced axially from the inward flange which is greater than the distance from the pipe end to the remote part of the retaining ring,
   and an annular gasket of resilient material having first and second faces complementary to the pipe's outer surface and said diverging inner wall respectively, and a third face which, when unstressed, converges in the axial direction away from the inward flange to meet the first face at a location which causes the axial extent of the first face to be greater than the axial extent of said diverging inner wall.

8. The invention claimed in claim 7, in which the annular adaptor has an outward flange for securing purposes.

9. The invention claimed in claim 7, in which the gasket has a further face normal to said first face and extending between the latter and the second face, the radial extent of said further face being substantially the same as the radial projection of said retaining ring beyond the peripheral groove.

10. The combination claimed in claim 3, in which said end face converges sharply in the direction opposite the divergence direction of said outer face when the annular gasket is unstressed and uncompressed, and in which the gasket has a radial face between the cylindrical inner face and the first diverging outer face, the radial extent of said radial face being substantially the same as the radial projection of said retaining ring beyond the peripheral groove.

* * * * *